May 17, 1927.
G. R. PENNINGTON
DUMP TRUCK
Filed June 30, 1924   3 Sheets-Sheet 1
1,628,907
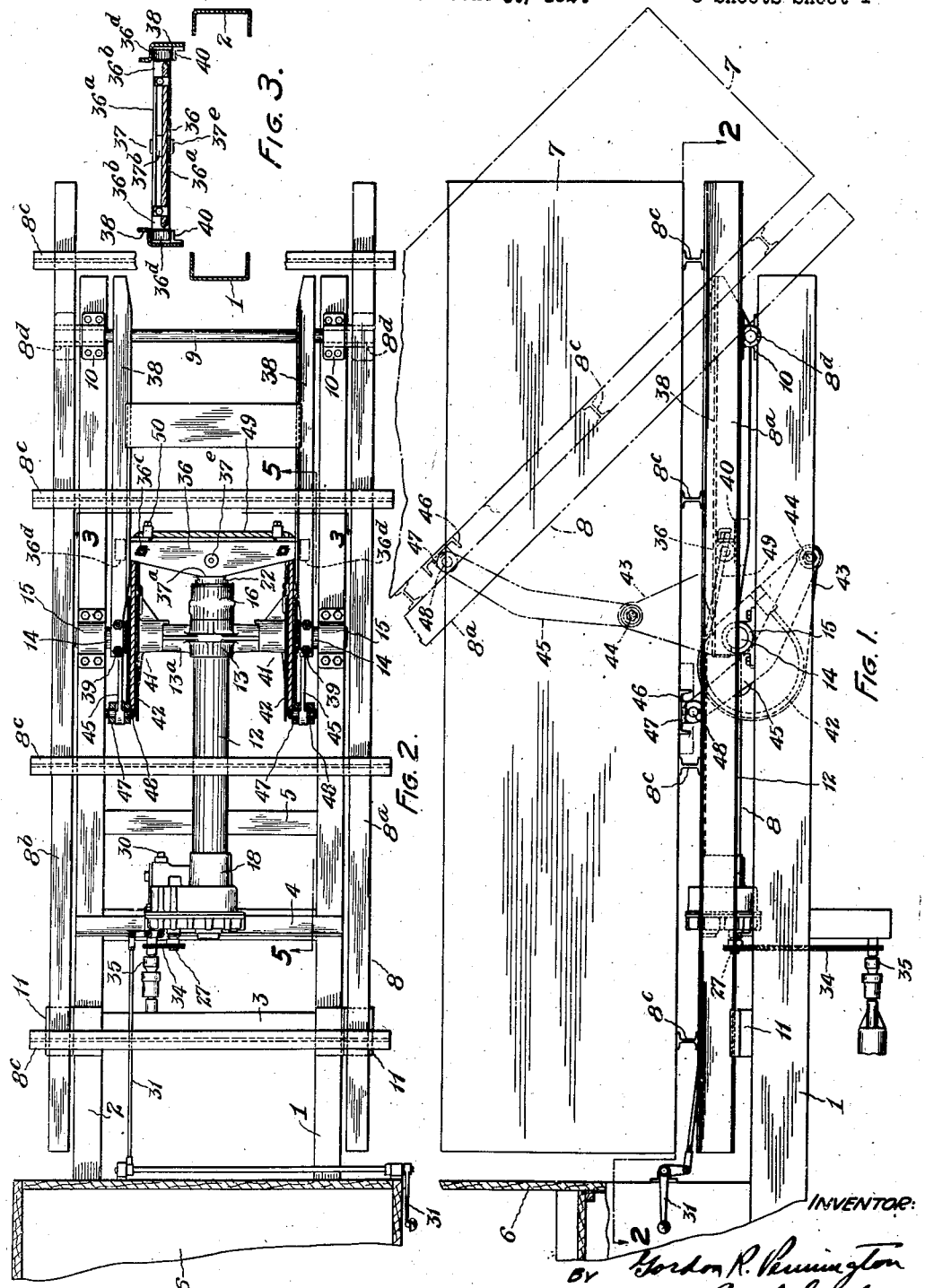
INVENTOR:
Gordon R. Pennington
BY
ATTORNEY.

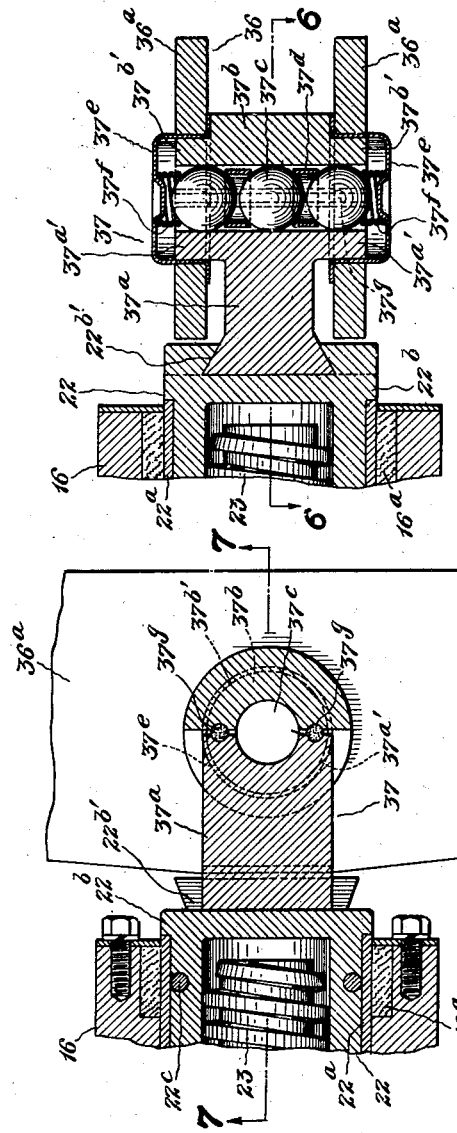
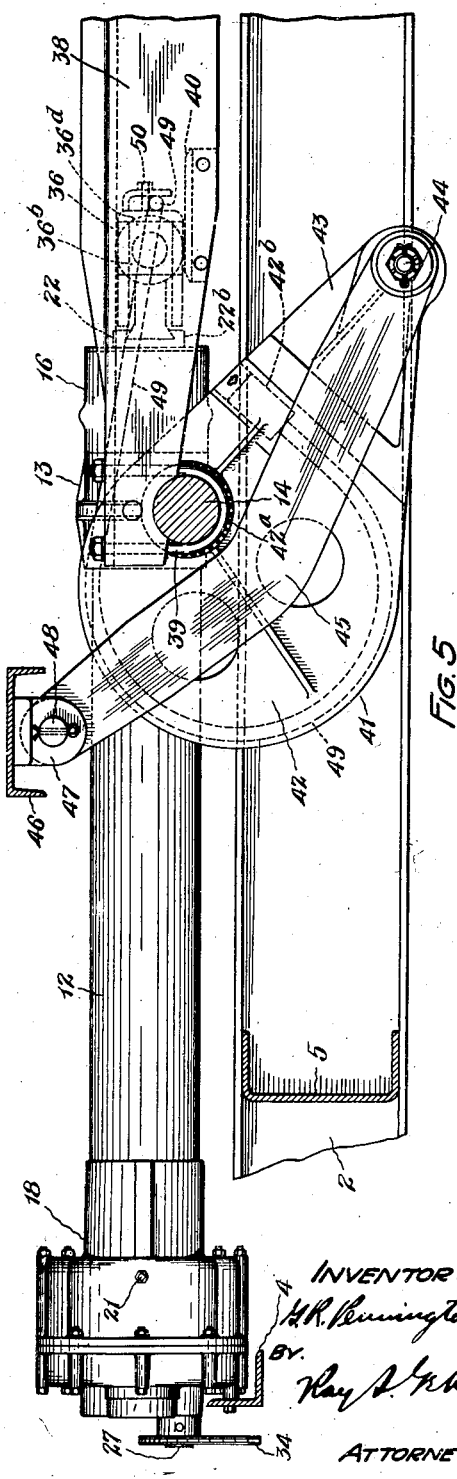

Patented May 17, 1927.

1,628,907

UNITED STATES PATENT OFFICE.

GORDON R. PENNINGTON, OF CLEVELAND, OHIO, ASSIGNOR TO THE VAN DORN IRON WORKS COMPANY, OF CLEVELAND, OHIO, A CORPORATION OF OHIO.

DUMP TRUCK.

Application filed June 30, 1924. Serial No. 723,077.

The invention relates to a hoisting mechanism especially adapted for elevating and lowering the bodies of dump trucks.

One object of the invention is the production of a hoisting mechanism for dump trucks and the like in which the working stresses are so minimized and so applied to the parts that the mechanism can be made relatively light in weight, and at the same time amply strong, and reliable and effective in operation.

Another object of the invention is the production of a hoisting mechanism for trucks that is compact and so disposed in relation to the essential parts of the truck as not to decrease the road clearance of the truck and also so disposed as to occupy space that would otherwise be unused and that, therefore, does not decrease the carrying capacity of a truck of given dimensions.

A further object of the invention is the production of a hoisting mechanism of the character specified which has an effective lifting leverage that is substantially constant for all positions of the truck body as it is lifted from its normal position to its dumping position.

Another object of the invention is the production of a hoisting mechanism for dumping trucks that can be produced at moderate cost.

Other objects more or less incidental or ancillary to the foregoing and a preferred manner of carrying out the invention will appear in the following description in connection with the accompanying drawings.

In the drawings, Fig. 1 is a side elevation of the rear part of the chassis frame and the dump body of a truck with my improved hoisting mechanism applied thereto, the elevated or dumping position of the truck body being indicated by dot and dash lines.

Fig. 2 is a section on the broken line 2—2, Fig. 1.

Fig. 3 is a section on line 3—3, Fig. 2.

Fig. 5 is an enlarged section on the line 5—5, Fig. 2, showing the hoisting mechanism in side elevation.

Fig. 6 is an enlarged fragmentary view showing the connection of the hoisting plunger and crosshead in horizontal section, the section being taken on the line 6—6, Fig. 7.

Fig. 7 is an enlarged fragmentary sectional view of the same part, the section being taken on the line 7—7, Fig. 6.

Figure 4:
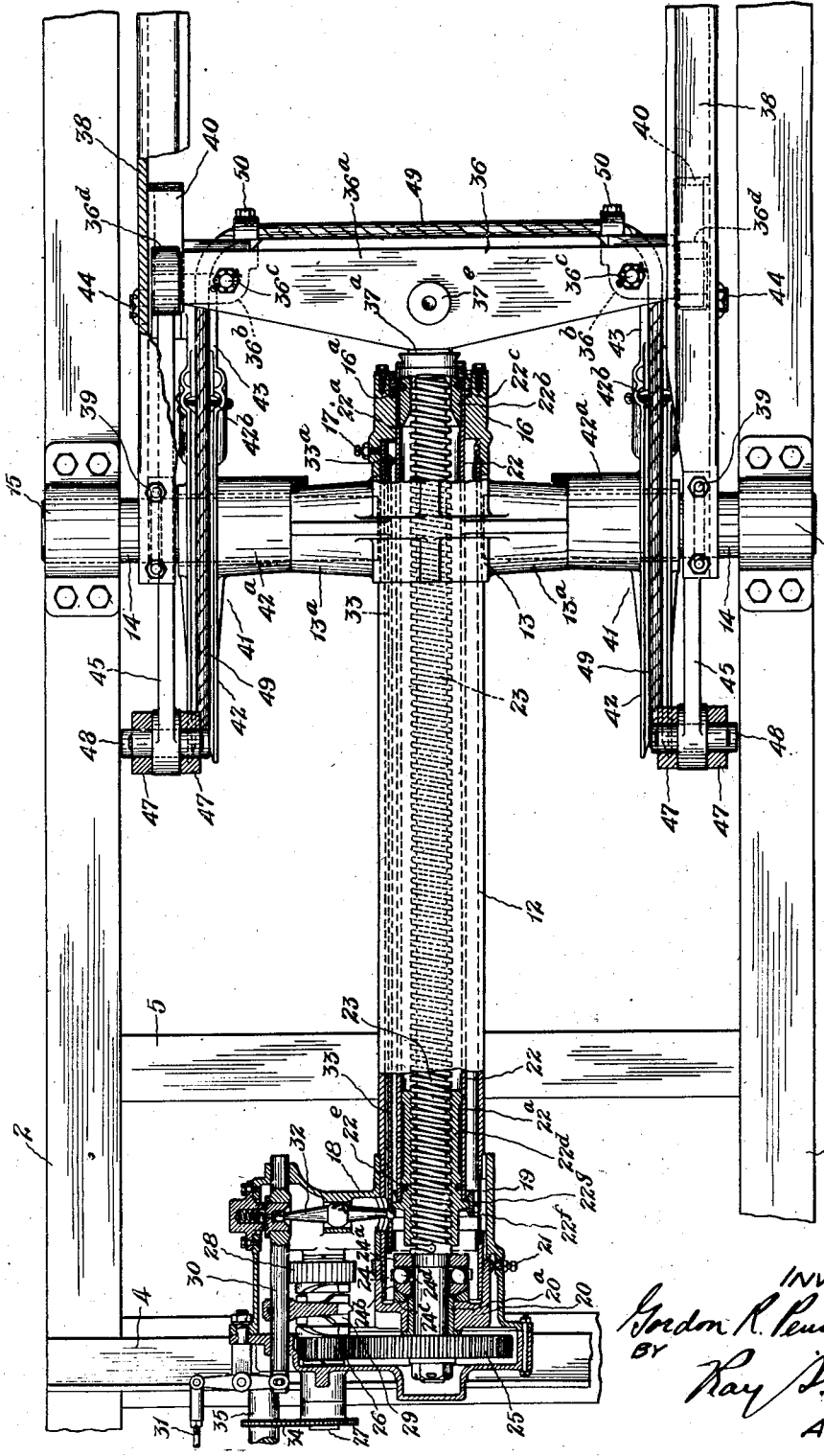
Fig. 4 is an enlarged plan view of the hoist mechanism with certain parts partially broken away and shown in section.

Referring in detail to the construction illustrated, 1 and 2 are the side bars of the main or chassis frame of a motor truck, the middle and rear parts only of said frame being shown in the drawings. These side bars are connected by suitable cross-bars or braces such as 3, 4 and 5. 6 is a portion of the driver's cab, the major part of it being broken away.

A pivotally mounted truck body 7 rests upon and is secured to a supporting frame designated in its entirety by 8. This supporting frame comprises the longitudinal channel bars $8^a$ and $8^b$ and a series of transverse bars or braces $8^c$. The rear parts of the frame bars $8^a$, $8^b$ are fitted with bearing brackets $8^d$, which are swiveled upon the ends of a transverse shaft 9 secured by clamping brackets 10 to the rear ends of the chassis frame bars 1 and 2. A pivotal support is thus provided for the rear end of the frame 8. The front end of said frame is supported by brackets 11, 11 carried by frame bars 1 and 2.

The foregoing truck chassis and body parts are of ordinary construction and constitute no part of the present invention, which relates to the improved hoisting mechanism for swinging the truck body upward on its pivotal support.

The hoisting mechanism referred to is of the screw-actuated plunger type. It comprises an elongated tubular plunger guide 12 supported by the chassis frame. The rear end of guide 12 is fitted with a crossbar casting 13 which has opposite tubular sockets $13^a$, in which are fixedly secured stud shafts 14, the outer ends of which are supported by bearing brackets 15 secured to the chassis frame bars 1 and 2. The casting 13 is secured on the guide tube 12 by the annular head 16 which is threaded on the tube 12 and serves to clamp the casting 13 against a suitable shoulder on the tube. The head 16 is secured in position by a set screw 17.

On the front end of the guide tube 12 is fitted a tubular part of a transmission gear casing 18. The casing 18 is held against turning on the guide tube 12 by key 19 and is secured against endwise movement by an annular bearing member 20 which is threaded on the end of the guide tube 12 and locked in an adjusted position by lock 21. The gear casing 18 rests upon and is secured to the transverse frame bar 4 of the chassis frame and thus affords support for the front end of the guide tube 12 and associated parts.

Within the guide 12 is mounted an elongated tubular plunger designated in its entirety by 22. This plunger comprises a tube 22ª which fits and slidably engages the aperture in guide head 16, the latter being preferably provided with a packing box 16ª. The rear end of the plunger is fitted with a cap 22ᵇ which is secured in the tube 22 by pins 22ᶜ or the like. In the front end of the plunger tube is mounted an elongated nut 22ᵈ which is secured to the tube by cross-pins 22ᵉ or the like. The nut 22ᵈ is formed near its front end with an annular flange which is embraced by a slit ring 22ᶠ, this ring being secured on the flange by a spring 22ᵍ in a well known manner. The ring 22ᶠ slidably engages the inner wall of the guide tube 12.

An elongated screw 23 telescopes within the plunger 22 and has thread engagement with its nut 22ᵈ. The front end of the screw is supported in a bearing sleeve 20ª of the bearing number 20 and adjacent said bearing sleeve is an anti-friction thrust bearing 24 comprising a ball race 24ª which snugly fits the screw shaft and abuts against the shoulder thereon, a second ball race 24ᵇ which loosely surrounds the screw shaft, a ring 24ᶜ which engages the race 24ᵇ on one side and the bearing member 20 on the other, and a series of balls 24ᵈ. The race 24ᵇ and the ring 24ᶜ have their mutually engaged surfaces spherical in form and as neither of these members engage the screw shaft, the thrust bearing is permitted to float laterally with the screw shaft and is self-alining.

Any suitable form of mechanism can be provided for rotating the screw 23 in so far as the present invention is concerned. As shown, the front end of the screw shaft is fitted with a large spur gear 25 which meshes with and is driven by a pinion 26 loosely mounted on a lay shaft 27 rotatably supported in the transmission gear casing 18. A second pinion 28 is loosely mounted on shaft 27 and meshes with a pinion on the usual reversing shaft (below shaft 27 and not shown) and said reversing shaft carries another pinion which meshes with gear 25 in the usual manner. Between the pinions 26 and 28 is a clutch, 29, slidably splined on shaft 27 so as to move into clutching engagement with either of the said pinions. The clutch 29 is connected to and actuated by a shaft 30 slidably mounted in the casing 18. This shaft 30 can be actuated manually by a train of lever-and-link connections 31 extending to a point conveniently adjacent the driver's seat and can also be actuated automatically by a lever 32 which is mounted in the casing 18 with one end connected to shaft 30 and its other end connected to an elongated bar 33 which is disposed between the guide 12 and the plunger 22. The rear end 33ª of the rod 33 is bent over so as to be engaged by ring 22ᶠ when it reaches the extreme rearward position of its movement with the plunger thus causing the movement of the lever 32, and the lever 32 is directly engaged by the ring 22ᶠ, when the latter reaches the extreme forward position of its movement with the plunger, thus moving the lever 32 in the opposite direction.

The shaft 27 of the transmission gearing can be actuated in any suitable manner, and in the construction illustrated is driven by a sprocket chain 34 which in turn is driven by a shaft 35 that is designed to connect with and be driven by the main transmission gearing (not shown) of the truck.

The movement of the hoisting plunger 22 is transmitted to a slide or crosshead 36 which, as shown, is in the form of a pair of heavy bars or plates 36ª which are secured in parallel spaced relation by trunnion blocks 36ᵇ that are secured between the respective ends of the plates 36ª by bolts 36ᶜ. The crosshead is operatively connected at its center to the rear end of the plunger by a connection designated in its entirety by 37. This connection, which is of peculiar form and constitutes an important part of my invention, comprises a member 37ª which has its front end flared upward and downward to slidably engage the laterally extending dovetail slot 22ᵇ' in the rear end of the plunger. The rear end of the connecting member 37ª is formed with upper and lower semi-cylindrical extensions 37ª'. A complementary member 37ᵇ is also formed with semi-cylindrical upper and lower extensions 37ᵇ', similar to extensions 37ª' except that they are shorter, measured vertically, and between the connecting members 37ª and 37ᵇ are arranged a plurality of large anti-friction balls 37ᶜ which are preferably held in spaced relations by rings 37ᵈ. The parts 37ª and 37ᵇ are secured in assembled relation by means of sheet metal cups 37ᵉ which fit within circular apertures in the crosshead plates 36ª. The cups 37ᵉ have flanged edges to engage the inner sides of the crosshead bars 36ª, coil springs 37ᶠ preferably being interposed between the cups and the anti-friction balls so as to yieldingly hold the respective parts in suitable contact with each other. The adjacent faces of the connector parts 37ª, 37ᵇ are formed with mating grooves to receiving suitable packing cords 37ᵉ which serve to exclude the dust from the anti-friction balls and, if desired, to retain grease or oil within the cavity.

The trunnion blocks 36ᵇ carry anti-friction rollers 36ᵈ which are designed to engage the under sides of horizontally disposed guide bars 38, the front ends of which are secured by U-bolts 39 or the like to the stud shafts 14 while the rear ends thereof are secured to the transverse bar 9. Near their front ends the guide bars 38 are fitted with brackets 40 which are adapted to support the crosshead 36 when it is in its forward or retracted position.

At each side of the crossarm casting 13 there is rotatably mounted on the stud shaft 14 a combined sheave and crank-arm structure designated in its entirety by 41. Each of these two structures, which are similar except for their right and left hand formation, is preferably formed in two parts 42 and 43 rigidly connected together by bolts (not shown). The part 42 is formed with a hub section 42ᵃ and a grooved periphery which is eccentric to the axis of the hub. The outer end of the part 43 carries a stud bolt or crank pin 44 which is connected by means of a bent link 45 to the bottom of the truck body structure as shown. The bottom of the truck body carries a transverse channel bar 46 which in turn carries brackets 47 to which the link 45 is pivotally connected by bolts or pins 48. The combined sheave and crankarm structure is operatively connected to the crosshead 36 by means of a flexible steel cable 49 which extends lengthwise along the crosshead 36 and passes through slots in the trunnion blocks 36ᵇ to which the cable is anchored by screws 50. The cable slots in the blocks 36ᵇ are open on the lower sides of the blocks to receive the cable when the parts are assembled. From the ends of the crosshead the cable ends extend to and around the grooved periphery of the sheave sections of the two structures 42, the ends of the cable being suitably anchored in sockets 42ᵇ of said structures.

In the operation of my improved hoisting mechanism, when it is desired to elevate the truck body 7 to dumping position, the driver has only to move the hand lever 31 and thereby throw the clutch 29 into engagement with the pinion 28 which, through the intermediate transmission gears (not shown), rotates the gear 25 and thus causes rotation of the screw 23 in a direction to force the plunger 22 rearward and the plunger carries with it the crosshead 36. Such movement of the crosshead is transmitted by the cable 49 to the combined sheave and crankarm structures 41 causing rotation of the latter from their lower position shown in Fig. 1, to their upper position indicated by dot and dash lines in Fig. 1. The movement of the crankarms is transmitted by the links 45 to the truck body, as will readily be understood. As the plunger 22 nears the end of its outward movement the ring 22ᶠ on the forward end of the plunger comes into engagement with the rear end 33ᵃ of the rod 33 and moves the latter endwise so as to disengage the clutch 29 from the pinion 28 and thereby automatically stop the hoist.

To lower the truck body after dumping, the driver moves the lever 31 in the opposite direction, thereby causing the clutch 29 to engage pinion 26 which meshes directly with the gear 25 and the hoist screw 23 is then rotated in the reverse direction to retract the plunger 22. As the plunger nears the end of its latter movement, it directly engages the clutch lever 32 to disengage the clutch and stop the hoist automatically.

In the rearward movement of the plunger to lift the truck body the leverage with which the power is applied is maintained substantially constant, notwithstanding the changing angular relations of the crankarms and links, because of the eccentric arrangement of the sheaves. In other words, this eccentric arrangement compensates for the changing leverage of the crank and link mechanism. From an inspection of Fig. 1 it will be noted that there is always a slight upward resultant force on the crosshead 36 and consequently its anti-friction guide rollers 36ᵈ are held in contact with the under-sides of the guide rails 38. The short supporting brackets 40 near the rear ends of the guide rails 38 serve simply to support the crosshead when the latter is not under load.

During the outward movement of the hoist plunger to elevate the truck body there is practically perfect freedom for limited relative lateral movement of the hoist plunger 22 and the crosshead 36 because of the peculiar construction of the connection between the plunger and crosshead. On reference to Figs. 6 and 7, it will be noted that the connecting member 37ᵃ is free to slide horizontally relative to the end of the plunger cap 22ᵇ and to slide vertically relative to the crosshead 36. Therefore, notwithstanding warpage or straining of the chassis frame on which the plunger guide 12 and the crosshead guides 38 are mounted, the thrust of the plunger is transmitted to the crosshead without the development of any severe lateral or bending stresses on the plunger and its guide or on the crosshead or on the connections between the plunger and crosshead. As the chassis frame is subject to warpage or distortion in vertical planes to a greater extent than in transverse planes, the freedom for relative vertical movement between the connecting member 37ᵃ and the crosshead is especially important and the anti-friction balls 37ᶜ between the connecting member 37ᵃ and the member 37ᵇ serve to reduce the friction incident to such relative vertical movement to a minimum.

In addition to the relative horizontal and vertical movements between the connecting member 37ª and the plunger and crosshead, respectively, the crosshead is given additional freedom for horizontal movement by the swiveling connection between it and the connecting members 37ª and 37ᵇ, and this, by permitting horizontal swinging of the crosshead, insures equalized transmission of the lifting force from the crosshead through the cable to the sheave and crank devices.

By reason of the special flexible connection which is effected between the hoist plunger and the crosshead and the resultant freedom from lateral bending stresses on the crosshead, plunger, guide and screw, these parts can be made relatively light in weight and still be amply strong to sustain the axial or longitudinal stresses requisite for elevating the loaded truck body. In this connection it will be noted, furthermore, that the mounting of the thrust bearing 24 of the hoist screw makes the latter free to align itself with its main supporting bearing 20ª, thus further eliminating any undue lateral stresses on the screw and associated parts. Thus if wear occurs in the main bearing 20ª, the thrust bearing readily accommodate itself to the changed position of the screw shaft, and under all conditions bearing 20ª sustains only radial loads and bearing 24 sustains only thrust loads.

The eccentric arrangement of the sheaves so as to compensate for loss of leverage in the crankarms obviates any undue increase in the stresses in the screw and plunger mechanism of the hoist, and this, too, favors a relatively light form of construction.

As will be readily understood, the relatively light screw, plunger and guide construction, as above described, can be produced at lower cost than would be possible in the case of a heavier plunger mechanism adapted to sustain severe lateral bending stresses and the heavier load of the plunger mechanism which would result if the effective leverage of the mechanism were not made substantially uniform.

Obviously, the hoist mechanism is highly compact vertically, is adapted to occupy space in the chassis frame not required for the regular truck parts, and does not decrease the road clearances of the truck.

While I have set forth above the preferred embodiment of the invention, it is to be understood that there can be wide variation from the construction disclosed without departing from the invention, the scope of which is indicated by the appended claims.

What I claim is:—

1. In a hoisting mechanism for elevating the pivotally mounted body of a dump truck, the combination of an elongated plunger; a guide therefor adapted to be mounted on the chassis frame of the truck; means for moving the plunger on its guide; and means adapted to operatively connect the plunger to the truck body comprising a crosshead, a guide for said crosshead adapted to be mounted on the said chassis frame, and connecting means between the plunger and crosshead adapted to permit their relative bodily movement in two planes substantially at right angles to each other.

2. A hoisting mechanism as claimed in claim 1 in which the means for moving the plunger on its guide comprises an elongated screw operatively engaging the plunger in telescoping relation.

3. A hoisting mechanism as claimed in claim 1 in which the connecting means between the plunger and crosshead is also adapted to permit their relative swinging movement in one of the two planes of their relative bodily movement.

4. In a hoisting mechanism for elevating the pivotally mounted body of a dump truck, the combination of an elongated plunger; a guide therefor adapted to be mounted on the chassis frame of the truck; means for moving the plunger on its guide; a crosshead; a guide for said crosshead adapted to be mounted on the said chassis frame; means adapted to transmit the movement of the crosshead to the body of the truck; and connecting means between the plunger and crosshead having a laterally sliding engagement with the plunger and a vertically moving anti-friction engagement with the crosshead.

5. A hoisting mechanism as claimed in claim 4 in which the connecting means between the plunger and crosshead has also a pivotal engagement with the crosshead permitting relative swinging of the plunger and crosshead.

In testimony whereof, I hereunto affix my signature.

GORDON R. PENNINGTON.